United States Patent
Hacker et al.

(10) Patent No.: US 8,911,184 B2
(45) Date of Patent: Dec. 16, 2014

(54) REGULATING ELEMENT

(75) Inventors: Michael Hacker, Nürnberg (DE);
Heinrich Manner, Guteneck (DE);
Xaver Spichtinger, Oberviechtach (DE)

(73) Assignee: Kennametal Inc., Latrobe, PA (US)

( * ) Notice: Subject to any disclaimer, the term of this patent is extended or adjusted under 35 U.S.C. 154(b) by 395 days.

(21) Appl. No.: 13/387,250

(22) PCT Filed: Apr. 23, 2010

(86) PCT No.: PCT/EP2010/002498
§ 371 (c)(1),
(2), (4) Date: Jan. 26, 2012

(87) PCT Pub. No.: WO2011/012179
PCT Pub. Date: Feb. 3, 2011

(65) Prior Publication Data
US 2012/0121346 A1    May 17, 2012

(30) Foreign Application Priority Data

Jul. 28, 2009   (DE) .......................... 10 2009 035 071

(51) Int. Cl.
*B23D 77/04*    (2006.01)

(52) U.S. Cl.
CPC ............ *B23D 77/042* (2013.01); *B23D 77/044* (2013.01); *B23B 2260/146* (2013.01)
USPC .......................................... 407/36; 408/153

(58) Field of Classification Search
CPC .... B23C 5/2462; B23C 5/2472; B23D 77/04; B23D 77/044; B23D 77/042; B23D 77/046
USPC .............. 407/36, 37, 38, 39, 44, 45; 408/153, 408/158, 161, 162, 168
See application file for complete search history.

(56) References Cited

U.S. PATENT DOCUMENTS

| 4,125,342 A | | 11/1978 | Kress | |
|---|---|---|---|---|
| 4,353,669 A | * | 10/1982 | Striegl | .......................... 408/185 |
| 5,709,510 A | * | 1/1998 | Scheer | .......................... 408/156 |
| 2002/0081168 A1 | | 6/2002 | Kress | |

FOREIGN PATENT DOCUMENTS

| CN | 101085479 A | | 12/2007 |
|---|---|---|---|
| DE | 3402551 A1 | * | 8/1985 |
| DE | 19708601 A1 | | 9/1998 |
| DE | 100 60 283 C1 | | 6/2002 |
| EP | 1 454 694 A1 | | 9/2004 |
| JP | 2008512260 A | | 4/2008 |
| WO | 2007/088353 A1 | | 8/2007 |
| WO | 2010/079473 A1 | | 7/2010 |

OTHER PUBLICATIONS

The International Bureau of WIPO, "International Preliminary Report on Patentability and Written Opinion", Feb. 7, 2012, 8 pp.
European Patent Office, International Search Report (and English language translation), Jul. 28, 2009, 7 pp.
Mar. 4, 2014—Translation—OA.

* cited by examiner

*Primary Examiner* — Andrea Wellington
*Assistant Examiner* — Alan Snyder
(74) *Attorney, Agent, or Firm* — Larry R. Meenan, Esq

(57) ABSTRACT

The invention relates to a regulating element for a cutting member clamped in a tool seat of a cutting tool, comprising a cylindrical basic body, and an active surface impacting the cutting member at a face side when in a mounted state, having a contour deviating from the cylindrical shape at the cylinder sleeve of the basic body as anti-twist protection for the regulating element.

20 Claims, 4 Drawing Sheets

REGULATING ELEMENT

The invention relates to a setting element for a cutting body clamped in a tool seat of a cutting tool and to a cutting tool comprising a cutting body set precisely by a setting element.

BACKGROUND OF THE INVENTION

WO 2007/088353 A1 discloses a tool clamping system which has a cutting body configured as a cutting insert, a clamping screw clamping the cutting insert in the tool seat, and a setting element for the precision setting of the cutting insert. In this case, the setting element is configured as a longitudinally displaceable setting wedge. The setting wedge has an active surface which runs obliquely relative to the basic body and which applies pressure to the cutting-body rear wall of the cutting insert, said cutting-body rear wall being remote from the active cutting edge of the cutting insert. The basic body of the setting element is of cylindrical configuration. The cylindrical configuration of the basic body has the advantage that the basic body of the setting element is automatically oriented in the likewise cylindrical setting element guide in such a way that the active surface of the setting element always bears flush against the rear side, assigned to it, of the cutting insert, the cutting-body rear wall. To realize its adjusting movement, the setting element is mounted in its guide in a longitudinally displaceable manner. To drive the setting element in its guide, a headless screw is screwed in at the end of the guide, said headless screw acting with the end of its shank upon the free end of the setting element, said free end being remote from the active surface of the setting element. The setting element is moved in the longitudinal direction of the guide toward the cutting-body rear wall by screwing the headless screw into the guide. The pressure on the rear wall of the cutting insert is reduced by unscrewing the headless screw, such that the setting element is moved in the guide away from the cutting insert.

A disadvantage with this embodiment is the fact that the setting element, which is actually very small, can undesirably rotate in its guide during the tool change. If this undesirable rotation is exceeded to a certain degree, the aforementioned effect of the automatic orientation of the setting element also no longer functions. On the contrary, the setting element encounters the cutting-body rear wall of the newly clamped cutting insert with regions of its active end which are completely unsuitable for the precision setting of the cutting insert. In the worst case, the basic body of the setting element and/or the indexable cutting insert will even be damaged. However, for the proper functioning of the setting element, it is necessary for the active surface to bear in a flush, that is to say planar, manner against the cutting-body rear wall active as bearing surface. In contrast, if the setting element bears against the cutting insert only in a point-like manner or on one side, this leads to undesirable stresses in the tool or to inaccuracies in the setting.

OBJECT OF THE INVENTION

Proceeding from these disadvantages, the object of the invention is to design a setting element in such away that it continues to be automatically oriented on the one hand but can no longer rotate undesirably in its guide on the other hand.

ACHIEVEMENT OF THE OBJECT

To avoid the undesirable rotatability, initial consideration should be given to a prismatic, in particular square, design of the basic body of the setting element. The risk of the undesirable rotation would then be effectively removed. However, a prismatic cross-sectional shape has the disadvantage that the bearing surfaces bear only linearly or even only in a point-like manner against the respective mating surfaces in the basic body on the one hand and against the cutting-body rear wall on the other hand, because the respective angles cannot be produced with infinite accuracy. In this way, the automatic orientation, desired with the invention, of the setting element in its guide for flat, in particular planar, bearing of the active surface against the associated rear wall of the cutting body would no longer be ensured. The achievement of the object therefore consists in substantially retaining the cylindrical outer contour of the setting element and in altering only a small region of the outer contour of the setting element in such a way that the undesirable rotatability is removed. The cylindrical basic body of the setting element has a circular, that is to say rotationally symmetrical, cross-sectional shape. Asymmetry of the cross section of the basic body serves as anti-rotation locking means, said asymmetry being integrally formed on or in the basic body only over a small angular range of the circular cross section. This contour deviating from the cylindrical shape of the basic body can be integrally formed both on and in the basic body. As a result of the modification of the basic body according to the invention, while at the same time retaining the cylindrical basic shape, the undesirable rotatability of the setting element is thus removed, while continuing to maintain the automatic orientation of the setting element in its guide. The rotationally locked setting element can still be rotated within a small angular range. The setting element can be automatically oriented both relative to the cutting-body rear wall active as bearing surface and relative to the inner walls of the guide in the basic body.

To achieve the object, a setting element for a cutting body is therefore proposed. The cutting body already rests in a prestressed manner in the tool seat of a cutting tool. The setting element has a substantially cylindrical basic body and, on its end face, an active surface acting upon the cutting body in the fitted state. A contour is integrally formed in or on the cylinder lateral surface of the basic body as an anti-rotation locking means for the setting element in order to deviate from the cylindrical shape of the basic body.

The claims which refer back to claim 1 contain partly advantageous developments of this basic invention and partly developments of this basic invention that are inventive on their own. In an advantageous configuration, it is proposed to integrally form the contour in the cylinder lateral surface of the basic body of the setting element. The simplest type of integral forming is a flat integrally formed in the cylinder lateral surface.

A further preferred embodiment is the slot-key combination claimed in claim 3 for forming the contour. In this case, a semicircular slot is formed in the cylinder lateral surface. A cylindrical pin can be inserted like a key into this slot. That region of the lateral pin surface which projects from the slot serves as contour in this case. In a further configuration, it is proposed to captively fix the pin in the slot. For example, it is conceivable to simply braze or adhesively bond the pin in the slot or to press it in as an oversize adaptation.

In an alternative configuration, it is proposed to integrally form the contour on the cylinder lateral surface instead of integrally forming it in the cylinder lateral surface. As a result, the cylinder lateral surface is completely retained. In a preferred configuration, a strip integrally formed on the cylinder lateral surface and extending over the entire length of the cylinder lateral surface serves as contour. In a further embodiment proposed as an alternative, the contour is designed as a nose which extends only over a section of the cylindrical outer lateral surface of the setting element. This nose is advantageously arranged in the region of the free end of the setting element, said free end being remote from the active surface. In this way, the guide for the setting element need only be shaped, in particular milled out, in the region of the insertion end of the setting element in order to provide an accommodating space for the nose. In this way, it is also possible to retrofit, by means of the invention, already existing tools having already existing guides for accommodating the setting element, as are known, for example, from the prior art cited above.

The development of the invention with a partly cylindrical body which is integrally formed on the cylindrical basic body is advantageous from the production point of view and is therefore inventive on its own. In this way, the setting element is given the outline form of two overlapping circle segments, that is to say substantially the cross-sectional shape of the Arabic numeral 8. According to the invention, the one circle segment forming the actual basic body of the setting element is markedly larger than the other circle segment forming the contour. From the production point of view, this variant has the advantage that first of all the locating hole for the contour can be drilled using a first small drill and then the actual guide for the setting element can be drilled in the same setup using a large drill. For the sake of completeness, it should be noted that this inventive advantage from the production point of view can also be realized with the slot-key combination, already described above, as contour.

A further advantageous configuration relates to the arrangement of the contour on the setting element with respect to its active surface. The active surface is slanted relative to the center longitudinal axis of the setting element in order to provide a setting wedge. The slanted active surface bears in a planar manner against the rear wall of the cutting body. The force transmission can be readily realized in the center longitudinal direction of the setting element via the headless screw. It is especially advantageous in the cylindrical configuration of the basic body when precisely that region of the cylinder lateral surface which is intersected by the normal of the active surface bears in an especially flush manner against the inner wall of the guide of the setting element. This bearing over a full surface area has the advantage that the setting element orients itself especially effectively in its guide relative to the cutting body. Therefore, in an advantageous configuration of the invention, provision is made to arrange the contour in a region of the cylinder lateral surface which is not congruent with the point of intersection of the normal of the active surface. It is considered to be especially advantageous to arrange the contour, with respect to the cross section of the basic body, at an angle of 90° to the region in which the normal of the active surface intersects the cylinder lateral surface. In this arrangement, the active surface also merges smoothly into the end face of the contour from the end face of the basic body.

DESCRIPTION OF THE EXEMPLARY EMBODIMENT

Figure 1:
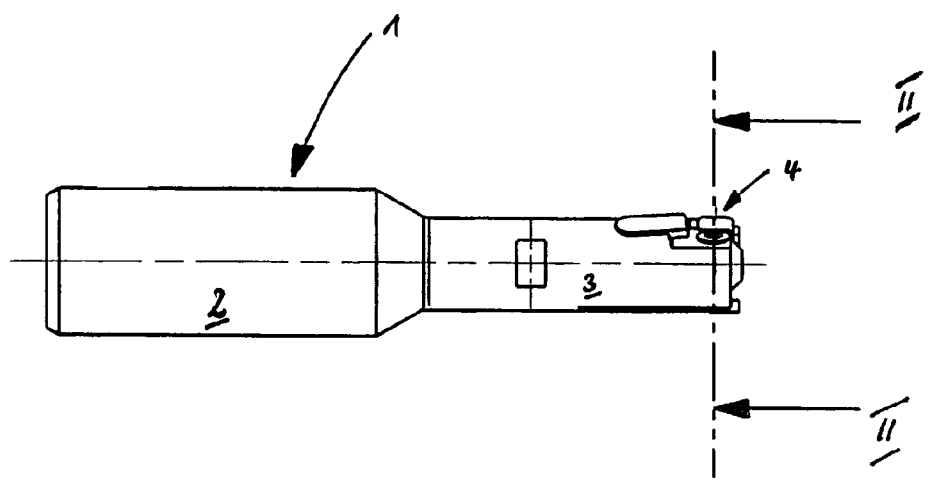
FIG. 1 shows the side view of a rotating cutting tool having a tool seat with a cutting body clamped therein and with a setting element according to the invention.
Figure 2:
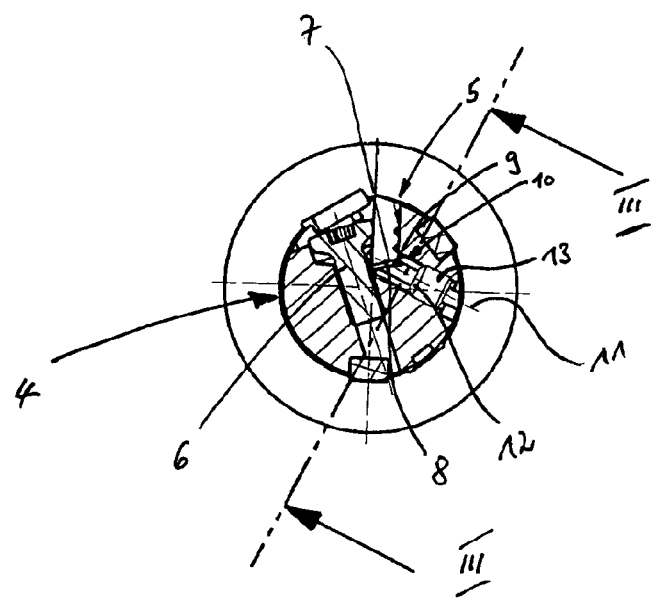
FIG. 2 shows the section II-II from FIG. 1.
Figure 3:
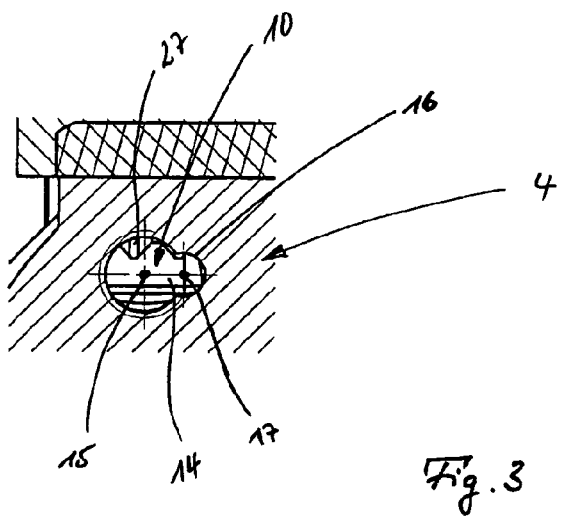
FIG. 3 shows the section III-III from FIG. 2.
Figure 4:
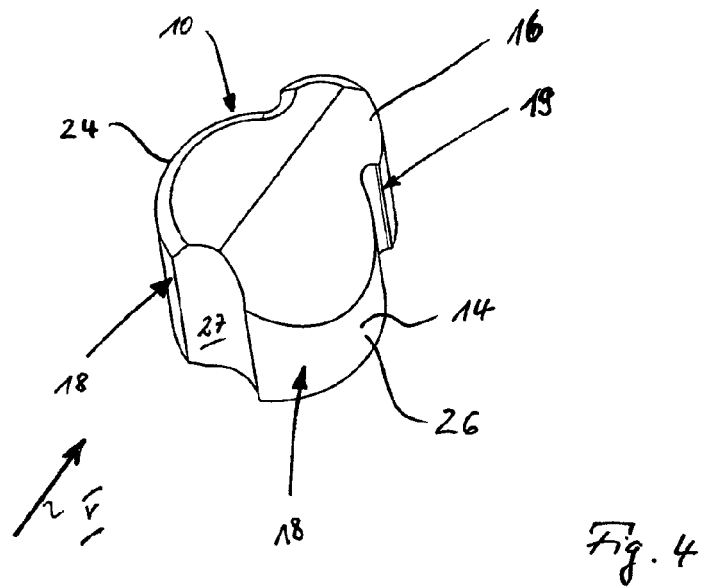
FIG. 4 shows the perspective view of an embodiment of the setting element according to the invention.

The rotating cutting tool 1 shown in FIG. 1 in its side view has a chucking region 2 for chucking the cutting tool 1 in the chuck of a machine tool and a tool receptacle region 3, on the end of which the tool seat 4 is formed. The details of the tool seat 4 are described in more detail with reference to FIG. 2. In principle, it is also possible to use the construction of the tool seat known from the prior art WO 2007/088353 A1—FIG. 5.

The cutting body 5 configured as a cutting insert is clamped in the tool seat 4 by means of a clamping screw 6. The cutting body 5 has a cutting edge 7, projecting from the tool seat 4, and a cutting-body rear wall 8. In the exemplary embodiment, the active surface 9 of the setting element 10 designed as a setting wedge bears in a planar and flush manner against the cutting-body rear wall 8.

The setting element 10 is acted upon by a headless screw 13 from its free end 12 remote from the active surface 9 in the direction of the center longitudinal axis 11 of the setting element 10. By means of the headless screw 13, the setting element 10 is mounted in a longitudinally displaceable manner in the direction of its center longitudinal axis 11 in its guide in the tool seat 4. The headless screw 13 thus serves as a rotary drive for the setting element 10.

The setting element 10 has a cylindrical basic body 14. The basic body 14 has a circular cross-sectional shape and is therefore centro-symmetric, in particular rotationally symmetric, to the circle center 15. The center longitudinal axis 11 passes as a normal through the circle center 15. In the exemplary embodiment, the contour 16 is integrally formed on the basic body 14. The contour 16 is in turn of cylindrical configuration. Since the contour 16 is integrally formed on the basic body 14, it is not a complete cylinder but rather only a cylinder segment docked, as it were, with the basic cylinder of the basic body 14. In other words, the contour 16 has the cross-sectional shape of a circle segment. This circle segment is in turn rotationally symmetric relative to the circle segment center 17. Since the complete circle, rotationally symmetric relative to the circle center 15, of the basic body 14 and the circle segment, rotationally symmetric about the circle segment center 17, of the contour 16 overlap one another, the setting element shown in the exemplary embodiment has more or less the cross-sectional shape of an Arabic numeral eight. The setting element 10 slides both with the cylinder lateral surface 18 of its basic body 14 and with the cylinder segment lateral surface 19 along the inner wall of its guide in the tool seat 4 in the direction of the center longitudinal axis 11 of the setting element 10.

The active surface 9 slanted relative to the cylindrical basic body 14 is arranged in the region of the end face 20. The active surface 9 is slanted relative to the cylindrical basic body 14 for forming a setting wedge. A flat region 21 of the end face 20 is adjacent to the active surface 9. The end face 20 has the bevel 22 in the area of the flat region 21. The bevel 22 serves as an aid for inserting the setting element 10 into its guide in the tool seat 4.

Figure 5:
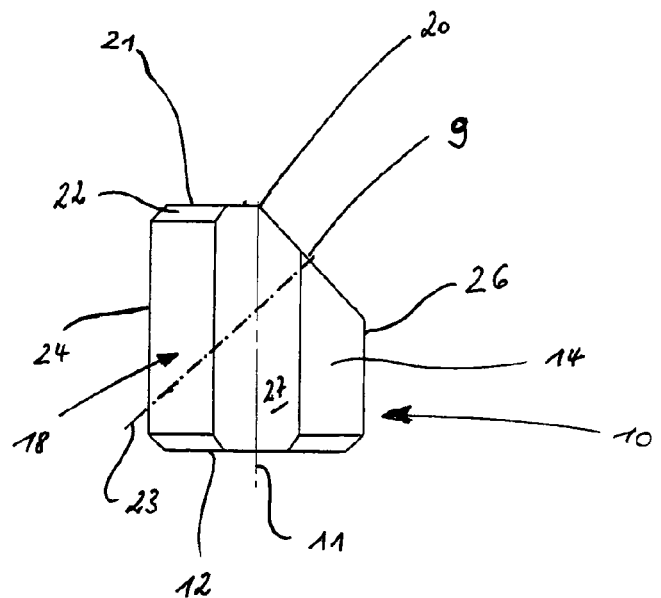
FIG. 5 shows the side view of the setting element shown in FIG. 4, according to arrow V in FIG. 4.

The normal 23, depicted by a broken line in FIG. 5, of the active surface 9 intersects the cylinder lateral surface of the basic body 14 in the region of the long side 24, shown on the left in FIG. 5. The long side of the basic body 14 is defined at the ends by the flat region 21 of the end face 20 on the one hand and by the free end 12, remote from the active surface 9, on the other hand. Accordingly, the short side 26 of the basic body 14 is shown on the right in FIG. 5. The short side 26 of the basic body 14 extends from the free end 12 right up to that end region of the active surface 9 which is remote from the flat region 21.

Figure 6:
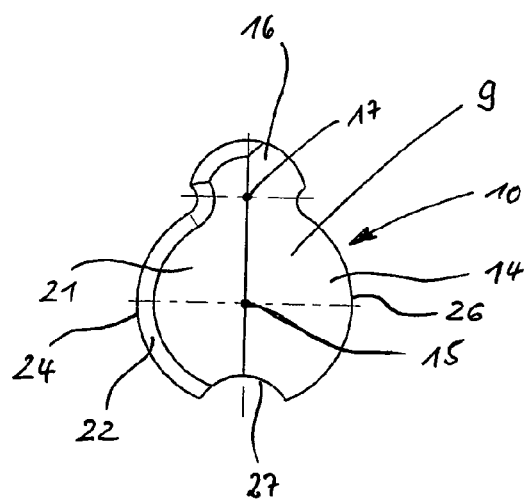
FIG. 6 shows a plan view of the end face of the setting element, with the active surface of the setting element shown in FIG. 4 and FIG. 5.
Figure 7:
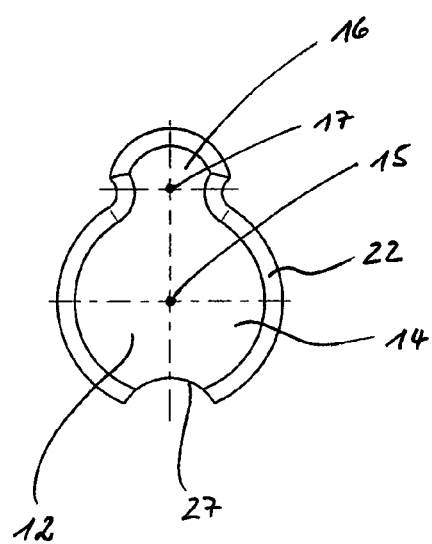
FIG. 7 shows a corresponding bottom view of the free end, remote from the active surface, of the setting element.

Since the force vector resulting from pressure applied by the active surface 9 to the cutting-body rear wall 8 runs in the direction of the normal 23, it is advantageous if the basic body 14 bears with the long side 24 of its cylinder lateral surface as far as possible over a surface area against the inner wall of the guide for the setting element 10 in the tool seat 4. In order to promote this bearing over a surface area, it is advantageous to keep the contour 16 as far as possible away from this bearing region. It can therefore also be seen especially well from the illustration in FIG. 6 that, in an especially preferred exemplary embodiment, the contour 16 is arranged at an angle of 90° with respect to the long side 24 of the cylinder lateral surface of the basic body 14. Finally, in the exemplary embodiment, a runout 27 is arranged diametrically opposite the contour 16. The runout 27 serves as a runout for the tool during the production of the setting element 10. However, the position of the runout 27 relative to the contour 16 is not imperative.

To produce the guide for the setting element 10 in the tool seat 4, first of all a hole having a diameter corresponding to the circle segment diameter of the contour 16 is made. This hole has a center which is congruent with the circle segment center 17 when the setting element 10 is fitted. A larger hole having a diameter which corresponds to the diameter of the basic body 14 is then made next to the circle segment hole. The center of this larger hole is in turn congruent with the center of the basic body 14 when the setting element is fitted.

The setting element functions as follows: when the cutting body 5 is being changed, the cutting body 5 is first of all clamped in the cutting tool 1 by means of the clamping screw 6. The cutting-body rear wall 8 then bears in a planar manner against the active surface 9. As a result of the cylindrical geometry of the basic body 14, the setting element 10 is automatically oriented in its guide in the tool seat 4. The end position of the cutting body 5 is set precisely by screwing in and unscrewing the headless screw 13 and the adjustment of the tool 1 is complete.

The invention claimed is:

1. A setting element for setting a cutting body clamped in a tool seat of a cutting tool, the setting element comprising:
    a basic body of generally cylindrical shape disposed about a longitudinal axis and structured to be disposed in a passage formed in the cutting tool, the basic body comprising:
        a first end structured to be engaged by a headless screw,
        an opposite second end having an active surface disposed obliquely to the longitudinal axis of the basic body, the active surface structured to engage the cutting body in a fitted state,
        a lateral surface extending between the first end and the opposite second end, and
        a contour portion, deviating from the generally cylindrical shape, on or in the lateral surface, the contour portion structured to limit rotation of the basic about the longitudinal axis within the passage formed in the cutting tool.

2. The setting element of claim 1 wherein the contour portion is integrally formed in the lateral surface of the basic body.

3. The setting element of claim 2 wherein the contour portion comprises a flat formed in the basic body.

4. The setting element of claim 1 wherein the basic body comprises a semicircular slot engaged by a cylindrical pin having a lateral pin surface, wherein a portion of the lateral pin surface engages the semicircular slot, and wherein another portion of the lateral pin surface forms the contour portion.

5. The setting element of claim 4 wherein the cylindrical pin is coupled in the semicircular slot.

6. The setting element of claim 1 wherein the contour portion is integrally formed on the lateral surface of the basic body.

7. The setting element of claim 6 wherein the contour portion comprises a strip extending over the entire length of the setting element.

8. The setting element of claim 6 wherein the contour portion comprises a nose extending from the lateral surface in the region of the first end.

9. The setting element of claim 6 wherein the contour portion comprises an extension extending from the lateral surface, the extension having a circular cross-sectional shape corresponding to a semicircle.

10. The setting element of claim 1 wherein the contour portion is disposed outside a region of the lateral surface in which the normal of the active surface intersects the lateral surface.

11. The setting element of claim 10 wherein the contour portion, with respect to the cross section of the basic body, is offset at an angle of 90° to the region in which the normal intersects the lateral surface.

12. A cutting tool comprising:
    a cutting tool having a seat portion and a passage formed therein adjacent the seat portion;
    a cutting body selectively coupled to the seat portion; and
    a setting element comprising:
        a basic body of generally cylindrical shape disposed about a longitudinal axis, the basic body disposed in the passage, the basic body comprising:
            a first end structured to be engaged by a headless screw,
            an opposite second end having an active surface disposed obliquely to the longitudinal axis of the basic body, the active surface structured to engage the cutting body,
            a lateral surface extending between the first end and the opposite second end, and
            a contour portion, deviating from the generally cylindrical shape, on or in the lateral surface, the contour portion structured to limit rotation of the basic about the longitudinal axis within the passage formed in the cutting tool.

13. The cutting tool of claim 12 wherein the contour portion is integrally formed in the lateral surface of the basic body.

14. The cutting tool of claim 13 wherein the contour portion of the setting element comprises a flat formed in the basic body.

15. The cutting tool of claim 12 wherein the basic body comprises a semicircular slot engaged by a cylindrical pin having a lateral pin surface, wherein a portion of the lateral pin surface engages the semicircular slot, and wherein another portion of the lateral pin surface forms the contour portion.

16. The cutting tool of claim 12 wherein the contour portion is integrally formed on the lateral surface of the basic body.

17. The cutting tool of claim 16 wherein the contour portion comprises a nose extending from the lateral surface in the region of the first end.

18. The cutting tool of claim 16 wherein the contour portion comprises an extension extending from the lateral surface, the extension having a circular cross-sectional shape corresponding to a semicircle.

19. The cutting tool of claim 12 wherein the contour portion is disposed outside a region of the lateral surface in which the normal of the active surface intersects the lateral surface.

20. The cutting tool of claim 19 wherein the contour portion, with respect to the cross section of the basic body, is offset at an angle of 90° to the region in which the normal intersects the lateral surface.

* * * * *

UNITED STATES PATENT AND TRADEMARK OFFICE
CERTIFICATE OF CORRECTION

| | | |
|---|---|---|
| PATENT NO. | : 8,911,184 B2 | Page 1 of 1 |
| APPLICATION NO. | : 13/387250 | |
| DATED | : December 16, 2014 | |
| INVENTOR(S) | : Hacker et al. | |

It is certified that error appears in the above-identified patent and that said Letters Patent is hereby corrected as shown below:

IN THE SPECIFICATION

In column 1, Line 60, delete "away" and insert -- a way --, therefor.

Signed and Sealed this
Seventh Day of April, 2015

Michelle K. Lee
*Director of the United States Patent and Trademark Office*